J. M. WHITMORE.
Nut-Lock.
No. 165,697. Patented July 20, 1875.
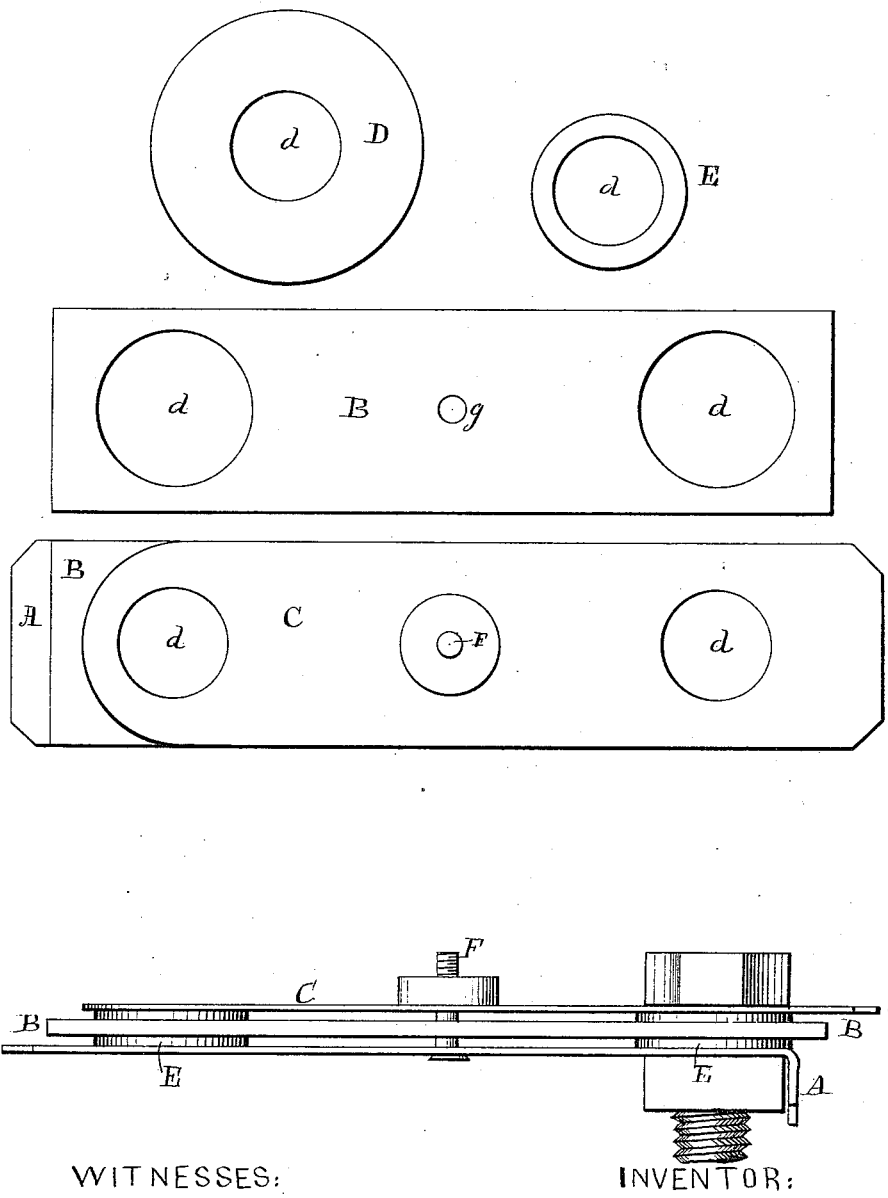
WITNESSES:
Smith Morton
A. E. Stanton
INVENTOR:
Joseph M. Whitmore

UNITED STATES PATENT OFFICE.

JOSEPH M. WHITMORE, OF VALPARAISO, INDIANA.

IMPROVEMENT IN NUT-LOCKS.

Specification forming part of Letters Patent No. 165,697, dated July 20, 1875; application filed October 3, 1874.

*To all whom it may concern:*

Be it known that I, JOSEPH M. WHITMORE, of Valparaiso, Porter county, Indiana, have invented a certain Improvement in Nut-Locks, of which the following is a specification:

The object of my invention is to prevent nuts coming off from bolts in places where there is so much strain and jar as to make them liable to loosen, and is designed particularly for use in fastening what are called fish-bars to railroad-rails, to keep the ends of the rails in place. It is also designed to add to the efficiency and durability of rings or washers of rubber used under the nut.

Its use is applicable chiefly where the bolts are used near each other.

It consists of three plates of sheet-iron or other metal, indicated in the accompanying drawing as A B C, with holes in the ends for bolts, it requiring two bolts to be used on; and the length of plates and distance between holes depending upon the distance apart of the bolts. The holes in the center of the plates are for riveting them together. There are also two rubber rings, E E, made to fit the holes *d d* in center plate B, which holes are enough larger than the bolts to admit the rubber rings E E, which rings have holes large enough to admit the bolts. The middle plate B is to be of a thickness proportionate to the thickness of the rubber rings, and the proportion is to be such that before the strain upon the rubber is sufficient to destroy its elasticity the thickness of the iron surrounding it shall take off the pressure. The rubber rings E E are to be put in holes in plate B, then on one side of the plate B is put plate A, and on the other plate C, and all fastened together by rivets through the holes *g* in center of plates. The bolts upon which the nuts are to be fastened are then passed through holes *d* at each end of plates. The nuts are then screwed down to the desired place, and the end of the outside plate is bent up squarely against the nut, thus securely fastening it. In case the end of the plate should get broken by being bent up and down in taking off nut, a thin washer D is provided to go on immediately under the nut, and when the nut is screwed down one edge of the washer is to be bent down squarely over the edge of the plate, and the other edge up against the side of the nut, thus fastening it as securely as the plate did before it was broken.

I claim as my invention—

1. The elastic ring E, passing entirely through the plate B, in combination with the plates A and C, substantially as and for the purpose set forth.

2. The combination of the plates A B C and the interposed elastic ring E, the latter being encircled within the aperture in the plate B, and the plate A bent to prevent the nut from turning, substantially as shown and described.

JOSEPH M. WHITMORE.

Witnesses:
SMITH MORTON,
A. C. STANTON.